Patented Feb. 5, 1952

2,584,475

UNITED STATES PATENT OFFICE 2,584,475

MANUFACTURE OF REFRACTORY ARTICLES

René Lecuir, Paris, France, assignor to Compagnie Generale de Telegraphie Sans Fil, a corporation of France No Drawing. Application July 7, 1947, Serial No. 759,475. In France August 12, 1946

4 Claims. (Cl. 106—55)

In the agglomeration of plastic masses, the less the friction in the body of the mass and against the walls of the apparatus used for shaping, the less the pressure necessary for the agglomeration. The pressure however must be sufficient either to ensure a certain degree of mobility, or to reduce the shrinkage of the mass and thus improve the accuracy of the dimensions of the finished pieces. Variations in the dimensions are moreover due to evaporation of the binder before agglomeration, such evaporation being all the more considerable, the higher the vapor tension of the binder. It is thus advantageous to use, as a binder, a liquid having a vapor tension as low as possible.

Moreover, the presence of the said liquid, while improving the mobility of the mass, generally tends to hinder the shaping by reducing the cohesion of the mass. It is known that the use of clayey suspensions, or emulsions in the presence of clay, facilitates the shaping since the clay ensures the necessary cohesion of the mass after it has been shaped. It is likewise known that the same result can be obtained in the absence of clayey constituents, by using aqueous gels obtained for example with fecula, starch, etc.

I have discovered that plastic masses formed with gels of this kind show the phenomenon of thixotropy, that is to say they can be made to pass from a rigid state to a liquid state by mere pressure, and again take on a rigid state, while at rest, when the pressure has ceased to be exerted. This phenomenon however can only be made use of in the shaping of the plastic mass if the passage from the liquid to the rigid state is quick enough. This is not the case with the use of the aqueous gels above referred to.

On the other hand, as I have also discovered, gels prepared from organic liquids, in particular from liquids having a certain unctuousness which reduces the internal friction of the mass, make it possible to obtain, with refractory powders, plasticizers for which the thixotropic modification of the passage from the liquid state to the rigid state is effected quickly enough to allow a suitable shaping.

According to one form of the present invention, for preparing plastic masses from refractory powders, the binder used is an organic liquid, which is preferably unctuous and which preferably has a vapor tension less than that of water and as low as possible, such as petroleum, oils, etc.

The cohesion of the agglomerated unfired product thus obtained may be afterwards increased in accordance with the invention, by introducing an auxiliary substance, used solely for its adhesive power, but remaining without influence on the thixotropic modifications of the mass. The introduction of such a substance has indeed proved to be indispensable when it is a question of obtaining more especially articles having thin parts or walls, for example for the manufacture of crucibles.

Finally, experience has shown that with a plasticizer prepared according to the invention, the pressure which has to be exerted for shaping or extrusion is less than in the case of a plasticizer prepared from an aqueous gel. This fact provides, among others, the advantage that it is easy to avoid variations in the speed with which the working pressure is brought into operation, which variations would otherwise result in a modification of the thixotropy, causing unevenness in shaping.

Some examples of plasticizers prepared in accordance with the principle of the invention will now be given, it being understood that the invention is not in any way limited thereby.

By dissolving 14 g. of ceresine in 100 cc. of terpineol and cooling, a gel is obtained which when malaxated with 500 g. of titanium oxide yields a paste which can be shaped under light pressure.

Likewise, by malaxating the above-mentioned gel with 600 g. of magnesium titanate, a paste is obtained for which the thixotropic passage from the liquid to the rigid state takes place as soon as the pressure is removed, which makes it very easy to extrude.

Likewise, finally, an extremely mobile plastic mass is obtained by forming a gel from 7 g. magnesium stearate and 250 g. of vaseline oil, and malaxating this gel with 315 g. of titanium oxide. With this plastic mass very thin articles may be molded. The resistance of such articles to deformation however is rather low; it can be increased by adding to the above-mentioned mass 3.5 g. of colophony, which does not in any way modify the molding conditions.

It will be understood that the principle of the invention still applies when, according to the shape and the intended use of the objects (tubes, crucibles etc.) modifications are made in the nature of the gel and of the powder, and of the possible adhesive, in the respective proportions of the constituents and the method of mixing them, in the agglomeration pressure, in the possible method of working the shaped object, and also in the nature of the molds used, whether they have porous walls or metal walls, etc.

I claim:

1. A method of manufacturing ceramic articles made by using refractory oxides, which comprises making a gel by dissolving ceresin in terpineol and cooling them, mixing refractory oxides powder with said gel so as to form a plastic thixotropic mass, and extruding said mass under pressure.

2. A method of manufacturing ceramic articles made by using refractory oxides, which comprises making a gel by dissolving ceresin in terpineol, the proportions being substantially 14 grams ceresin for 100 cubic centimeters terpineol, and cooling them, mixing refractory oxides powder with said gel so as to form a plastic thixotropic mass, and extruding said mass under pressure.

3. A method of manfacturing ceramic articles, comprising making a gel with substantially 14 grams ceresin and 100 cubic centimeters terpineol, mixing this gel with substantially 500 grams of refractory oxides powder forming a plastic thixotropic mass and extruding this mass under pressure in order to provide an article of a particular shape.

4. A material for extruding under pressure, comprising refractory oxides material in a powder state, the particles of which are coated with a gel, this latter being constituted by terpineol and ceresin.

RENÉ LECUIR.

REFERENCES CITED

The following references are of record in the file of this patent:

UNITED STATES PATENTS

| Number | Name | Date |
|---|---|---|
| 1,847,196 | Scott | Mar. 1, 1932 |
| 2,122,960 | Schwartzwalder | July 5, 1938 |

FOREIGN PATENTS

| Number | Country | Date |
|---|---|---|
| 531,676 | Great Britain | 1941 |
| 71,299 | Germany | 1893 |